United States Patent [19]

Fukushima et al.

[11] Patent Number: 4,807,157

[45] Date of Patent: Feb. 21, 1989

[54] METHOD OF DISPLAYING A MAP

[75] Inventors: Atsuhiko Fukushima; Takashi Kashiwazaki; Masayuki Hosoi; Hitoshi Ando, all of Saitama, Japan

[73] Assignee: Pioneer Electronic Corporation, Tokyo, Japan

[21] Appl. No.: 115,732

[22] Filed: Nov. 2, 1987

[30] Foreign Application Priority Data

Oct. 31, 1986 [JP] Japan .................................... 260421

[51] Int. Cl.$^4$ .............................................. G06F 3/14
[52] U.S. Cl. .................................... 364/521; 364/449; 340/701; 340/995
[58] Field of Search ............... 364/443, 444, 449, 518, 364/521; 340/988, 990, 995, 701, 703; 73/178 R; 342/451

[56] References Cited

U.S. PATENT DOCUMENTS

| | | |
|---|---|---|
| 4,638,438 | 1/1987 | Endo et al. ........................... 364/449 |
| 4,677,574 | 6/1987 | Kausch ................................ 364/521 |
| 4,689,747 | 8/1987 | Kurose et al. ..................... 73/178 R |
| 4,710,806 | 12/1987 | Iwai et al. ........................... 364/521 |
| 4,731,742 | 3/1988 | Nishi et al. ......................... 364/521 |

Primary Examiner—Gary Chin
Attorney, Agent, or Firm—Sughrue, Mion, Zinn, Macpeak and Seas

[57] ABSTRACT

A method for displaying a map, including steps of evaluating a start dot and an end dot of each segment defining a boundary of a predetermined area on the map, storing sequentially each of the evaluated data so that each of the segments has a lateral deflection with respect to the predetermined area, determining the lateral deflection of the predetermined area according to the evaluated data for the start and end dots of the segment when the predetermined area is painted on a display unit, calculating a start point for painting positioned inward of the segment and each of the evaluated data, and painting the predetermined area with a predetermined color from the start point.

5 Claims, 16 Drawing Sheets $$\begin{cases} N_x = f_x(crnt_x) \\ N_y = f_y(crnt_y) \end{cases}$$

FIG. 5A

|  |  |  |  | (3,3) |
|---|---|---|---|---|
|  |  |  |  |  |
|  |  |  |  |  |
| (0,2) | (1,2) | (2,2) |  |  |
| (0,1) | (1,1) | (2,1) |  |  |
| SECTION NO. (0,0) | (1,0) | (2,0) |  |  |

$S_y$ ↑, $S_x$ →

$S_x = g_x (\text{crnt } X)$
$S_y = g_y (\text{crnt } Y)$

FIG. 5B
ROAD SECTION OFFSET ADDRESS

| OFFSET ADDRESS |
|---|
| (0,0)ℓ |
| (1,0)ℓ |
| (2,0)ℓ |
| ⋮ |
| (0,1)ℓ |
| (0,2)ℓ |
| ⋮ |
| (3,3)ℓ |

1 WORD = 16 bit

FIG. 5C
INTERSECTION SECTION OFFSET ADDRESS

| OFFSET ADDRESS |
|---|
| (0,0)c |
| (0,1)c |
| (0,2)c |
| ⋮ |
| (0,1)c |
| (0,2)c |
| ⋮ |
| (3,3)c |

1 WORD = 16 bit

MAP ON A SCALE OF 1:50,000
*FIG. 9A*
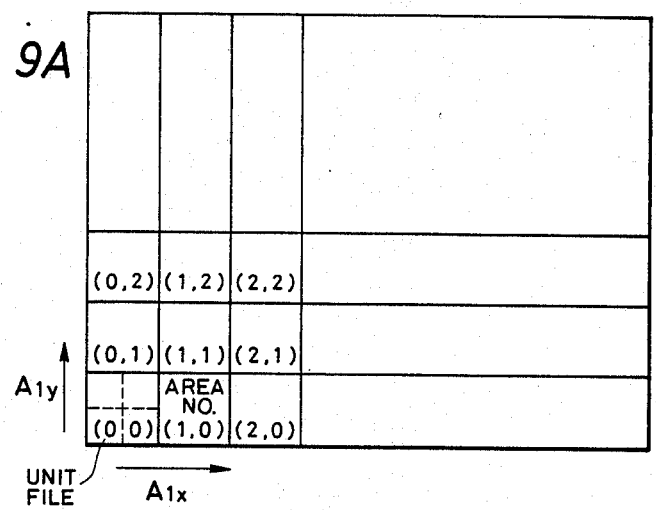
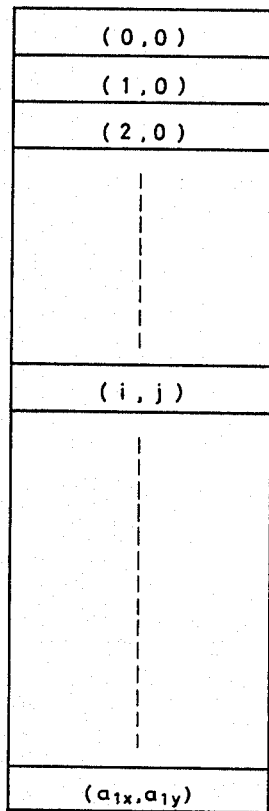
*FIG. 9B*
PICTURE ID FOR A MAP ON A SCALE OF 1:50,000
| 1:50,000 IN LEVEL OF AREA(i,j) POLYGON HEAD ADDRESS |
| 1:50,000 IN LEVEL OF AREA(i,j) LINE 1 HEAD ADDRESS |
| 1:50,000 IN LEVEL OF AREA(i,j) LINE 2 HEAD ADDRESS |
| 1:50,000 IN LEVEL OF AREA(i,j) CHARACTER HEAD ADDRESS |
| 1:50,000 IN LEVEL OF AREA(i,j) LETTER HEAD ADDRESS |
| POLYGON DATA SIZE |
| LINE 1 DATA SIZE |
| LINE 2 DATA SIZE |
| CHARACTER DATA SIZE |
| LETTER DATA SIZE |
| EMPTY |
EACH FOR FOUR UNITS FIG. 10A
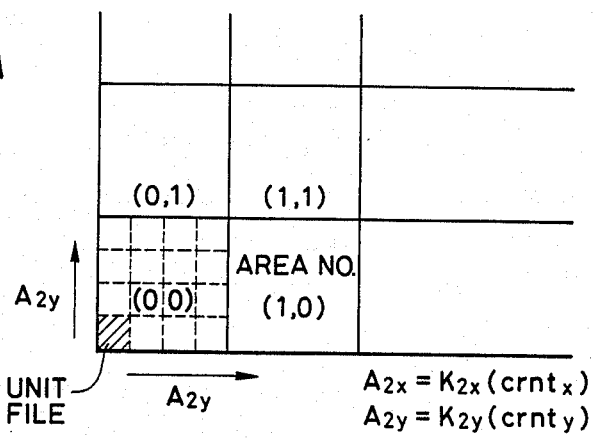
FIG. 10B
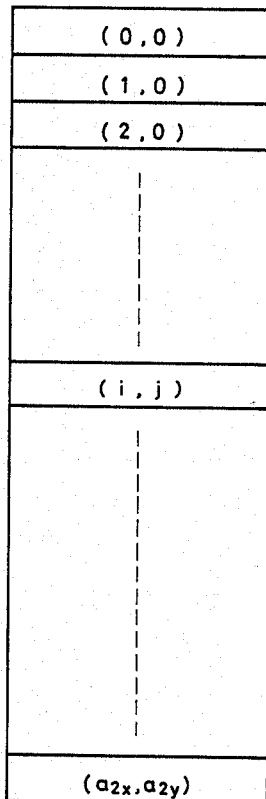
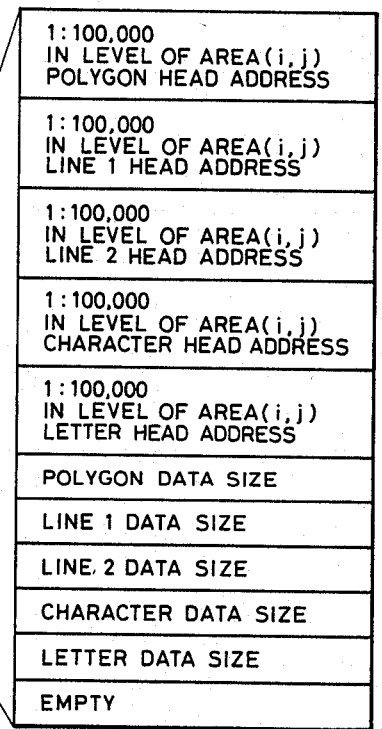

| LINE DATA | | |
|---|---|---|
| 0 | | |
| PROPERTY | BIT FOR THINNING | 0 |
| $X_0$ | | |
| $Y_0$ | | |
| ⋮ | | |
| PROPERTY | BIT FOR THINNING | 1 |
| $X_1$ | | |
| $Y_1$ | | |
| ⋮ | | |
| i | | |
| PROPERTY | BIT FOR THINNING | 2 |
| $X_i$ | | |
| $Y_i$ | | |
| i + 1 | | |
| PROPERTY | BIT FOR THINNING | 0 |
| $X_{i+1}$ | | |
| $Y_{i+1}$ | | |
| ⋮ | | |
| n | | |
| PROPERTY | BIT FOR THINNING | 2 |
| $X_n$ | | |
| $Y_n$ | | |

COORDINATES NUMBER (SERIAL NUMBER IN UNIT)
FOR PROPERTY, THINNING AND TYPE OF BIT
COORDINATES FOR UNIT

PACKAGE 0
PACKAGE 1

1 WORD = 16 bit

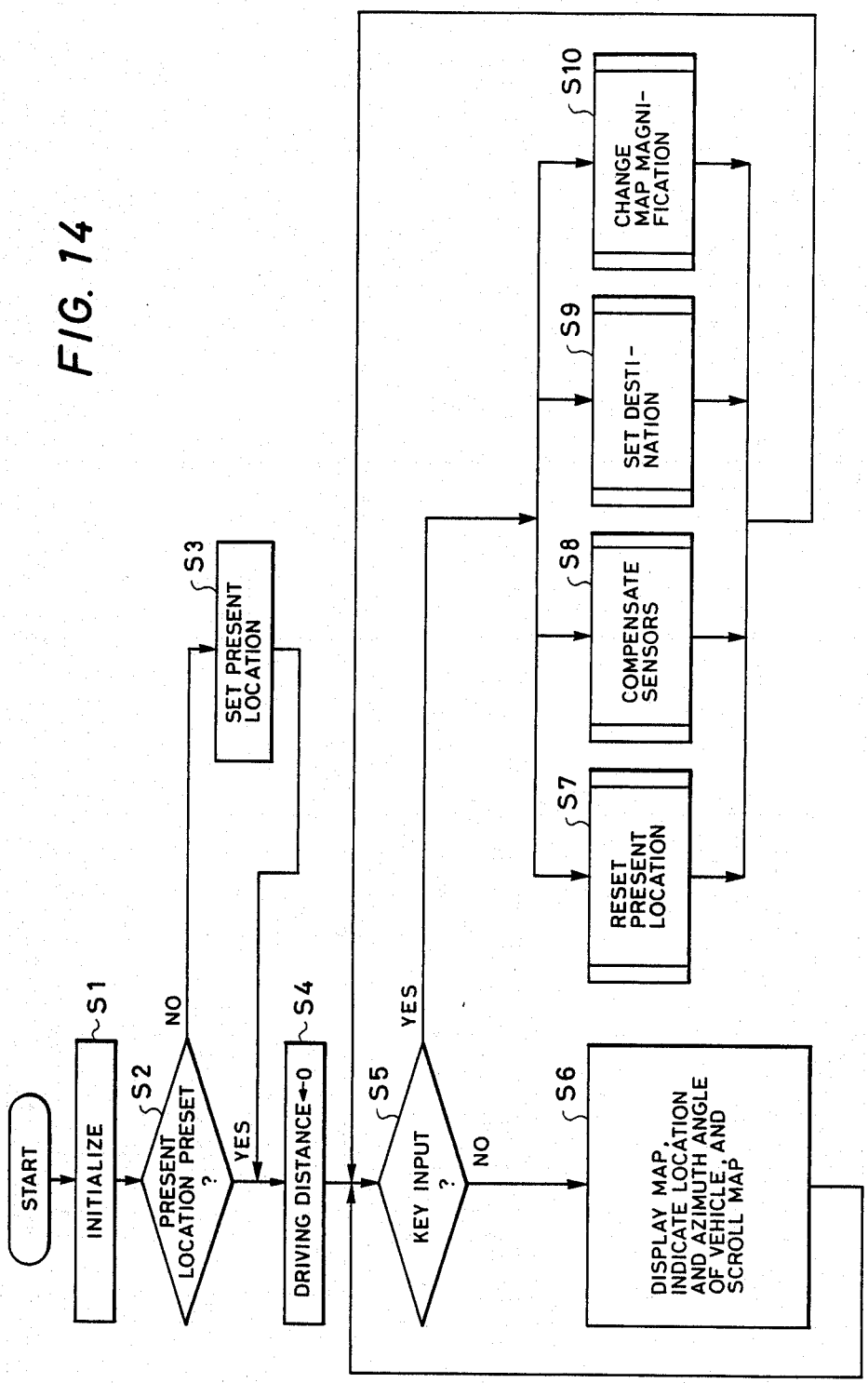

METHOD OF DISPLAYING A MAP

BACKGROUND OF THE INVENTION

The present invention relates to a method for displaying a map, and more particularly to a method for displaying a predetermined area on a map in a navigation system for a motor vehicle.

Recently there has been developed a vehicular navigation system which can display map information pre-stored in a memory together with an indication on the map of the vehicle's present position, to thereby allow the driver to easily determine the best route to the desired destination.

In such a navigation system, when the map is displayed on a display unit, areas such as rivers, streams, lakes, wooded tracts, and the like are indicated by specific corresponding colors so that these areas are easy to pick out. This "painting" operation is performed with respect to the boundaries of the specific area to be displayed in color on the display unit. That is, a start point for painting is chosen within the boundaries of the specific area, and the area is then filled in with the designated color up to the boundaries. Only one start point is ordinarily required for each area to be painted.

The above system includes a memory for storing digital data indicating the start and end points of line segments defining the boundaries of the areas to be painted, together with data indicating the start point for the painting operations. Thus actual painting operation of the predetermined area begins at thus-designated start point.

The range which can be displayed on the display unit is limited by the surface size of the display unit and, therefore, the entirety of the area to be painted may not be displayed on the display unit but may be divided between displayed and nondisplayed portions The conventional system is disadvantageous in that there is a possibility that the predetermined area displayed on the display unit thus may not contain the designated start point for the painting operation. If such occurs, the user must manually input a new start point for the painting operation, making the input operation for the system complex.

SUMMARY OF THE INVENTION

The present invention was made in view of the above-mentioned disadvantages of the conventional system.

Therefore, an object of the present invention is to provide a method for displaying a map which eliminates complex operations such as manual inputting of the start point for painting operations.

Another object of the invention is to provide a display device in which the map displayed on the display unit can be freely divided without difficulty.

The method for displaying a map according to the present invention comprises steps of evaluating data for start and end points of segments indicating the boundaries of the area to be painted, and storing sequentially the evaluated data so that each of the segments has a lateral deflection with respect to the area to be painted. The method of the invention further comprises steps of determining the lateral deflection of the segment with respect to the area to be painted according to the evaluated data for the start and end dots of a predetermined segment, determining a redesignated point in the area to be painted within the actually displayed area, and performing the painting operation from the redesignated start point.

BRIEF DESCRIPTION OF THE DRAWINGS

FIGS. 2A to 12B are charts showing steps in data formation for the map information to be stored on a recording medium shown in FIG. 1;

FIG. 14 is a flowchart showing a basic program performed by a CPU shown in FIG. 1;

DESCRIPTION OF THE PREFERRED EMBODIMENTS

A preferred embodiment of the present invention will now be described in detail with reference to drawings.

Figure 1:
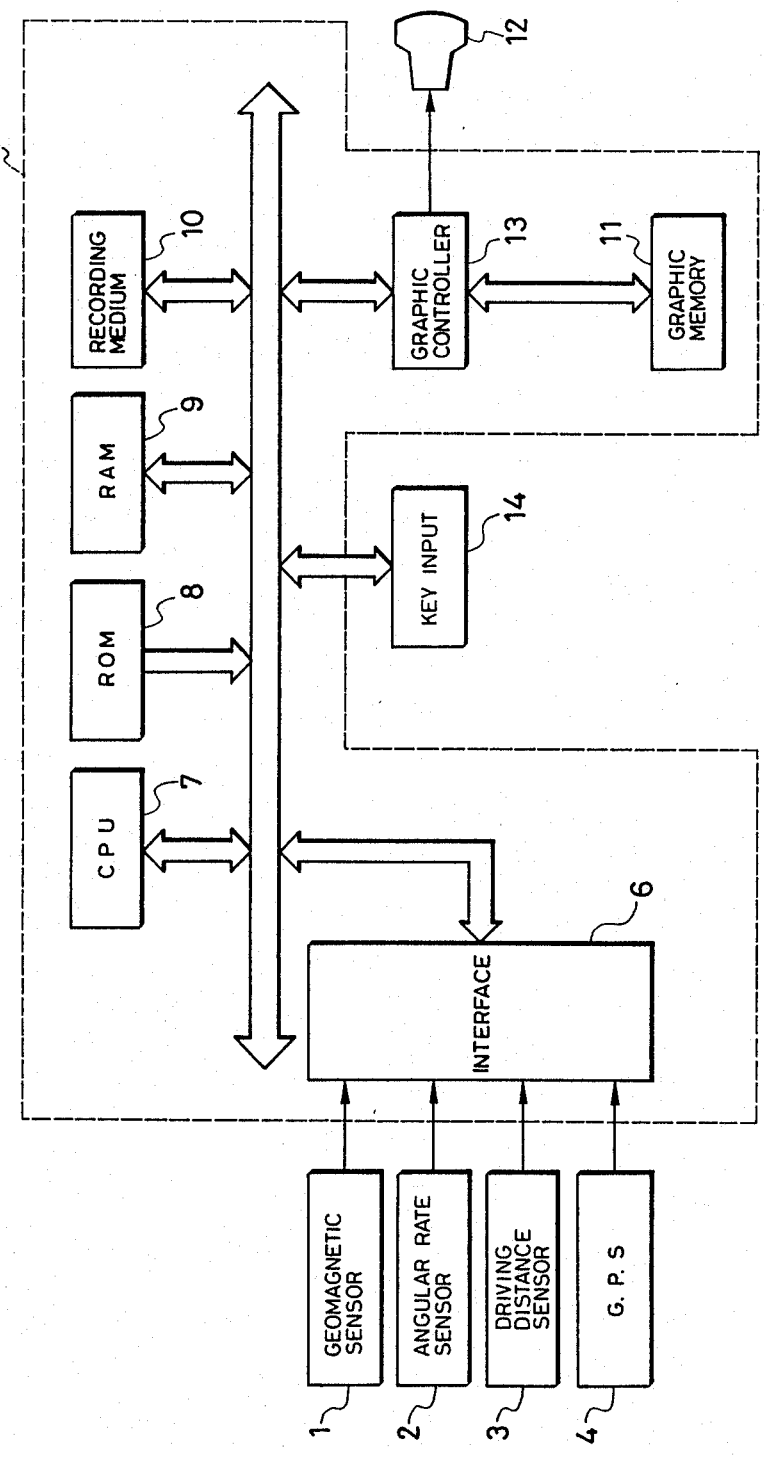
FIG. 1 is a block diagram showing a navigation system for a vehicle to which a method for displaying a map of the present invention can be applied.

FIG. 1 is a block diagram showing a navigation system to which a method of the present invention can be applied.

The navigation system includes a geomagnetic sensor 1 for outputting azimuth data for the vehicle based on the geomagnetic field of the earth, an angular rate sensor 2 for detecting the angular rate of movement of the vehicle, a driving distance sensor 3 for detecting the distance the vehicle has moved, and a GPS (Global Positioning System) 4 for detecting the location where the vehicle is at present according to latitude and the longitude information and the like. The output signals of the sensors are supplied to a system controller 5. The system controller 5 includes an interface 6, a CPU (Central Processing Unit) 7, a ROM (Read Only Memory) 8, a RAM (Random Access memory) 9, a recording medium 10, a graphic memory 11, and a graphic controller 13.

The interface 6 digitizes the analog output signals from the sensors. The CPU 7 processes many types of pictorial information and calculates, for example, the distance the vehicle has moved based on the output data supplied from the sensors. Processing programs for the CPU 7 and other information necessary for operating the system are previously written in the ROM 8. Information necessary for performing the processing programs for the CPU 7 is written into and read from the RAM 9. Digitized (evaluated) map information is stored on the recording medium 10, which may be a so-called CD-ROM (compact disk read-only memory), an IC semiconductor memory, or the like. The graphic memory 11 includes a V-RAM (Video RAM), for example, the graphic controller 13 receives the graphic data such as map data and outputs it as a picture information. The graphic data is stored in the graphic memory 11 by the graphic controller 13. An input device such as a keyboard supplies several types of instructions to the system controller 5 in response to key operations by the user.

Figure 2A:
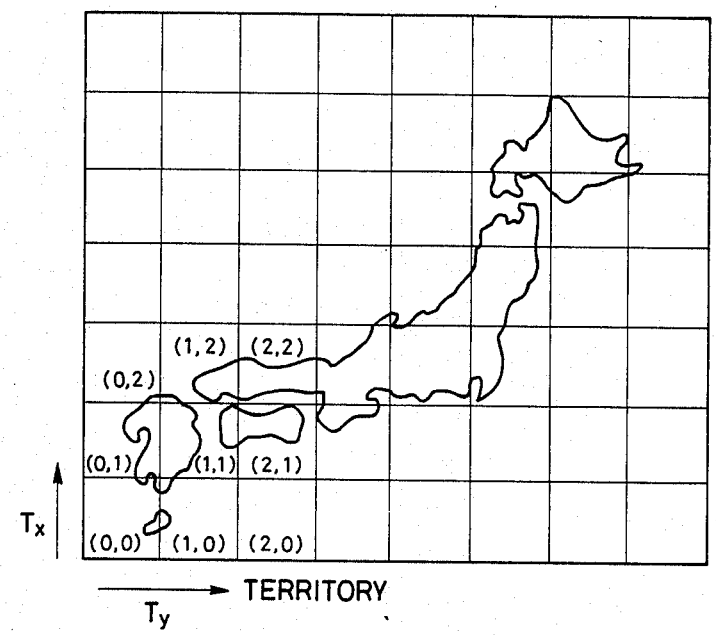

Map information is stored on the recording medium 10, an example of the data formation for which is carried out as follows:

As shown in FIG. 2A, a complete map of Japan is divided into grids. One such grid square, herein called a "territory", is, for example, 16,384 ($=2^{14}$) meters square, and is assigned, a number ($T_x$, $T_y$) with reference to a leftmost-and-lowermost territory on the map as shown in FIG. 2A. Each territory has its own territory number. The actual territory number of any territory can be determined by a present place datum (Crnt x, Crnt y) of the vehicle. The territory is the largest unit of data formation according to the invention.

Figure 2B:
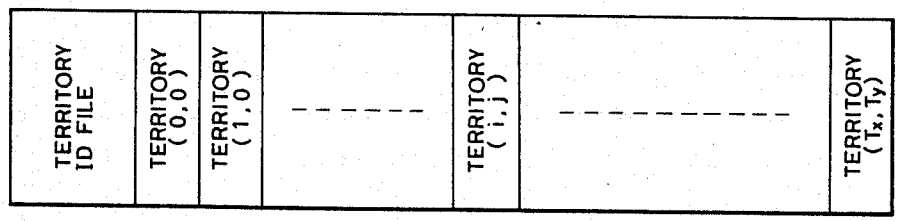

FIG. 2B shows data formation for the entire map. A territory ID file includes, as shown in FIG. 2C, files of all territories. Each of the files has its own territory number ($T_x$, $T_y$) and also contains data inclusive of a head address, latitude (real number) and longitude (real number) of a leftmost-and-lowermost portion of the territory, the declination (real number) of the geomagnetic field, and the like. The territory ID file is the most important file in the data formation process according to the invention, and several types of map data or necessary data for displaying the map are stored in the territory ID file.

Figure 3A:
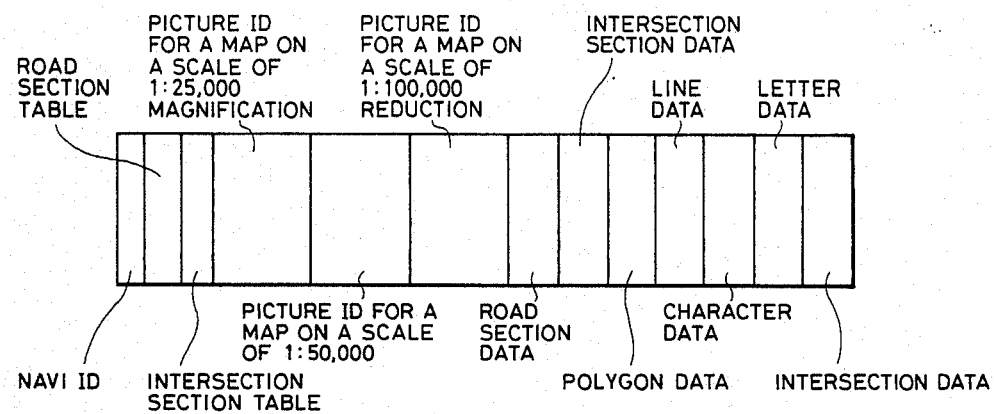

In FIG. 3A, NAVI ID and section tables are files provided for searching roads and intersections, picture IDs are files for controlling the display, and data included in road section data and intersection data are actual map data.

Figure 3B:
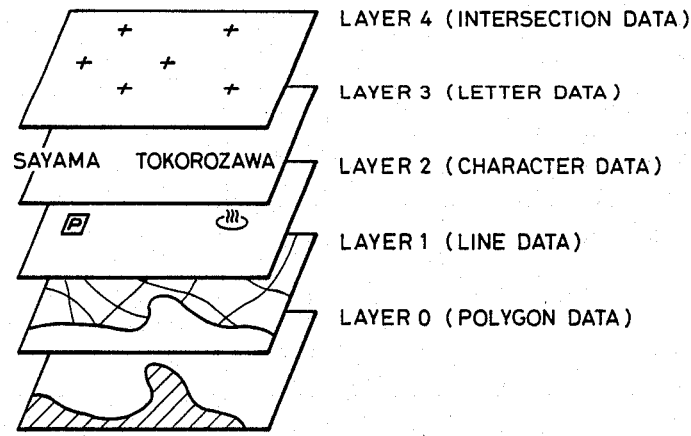
Figure 3C:
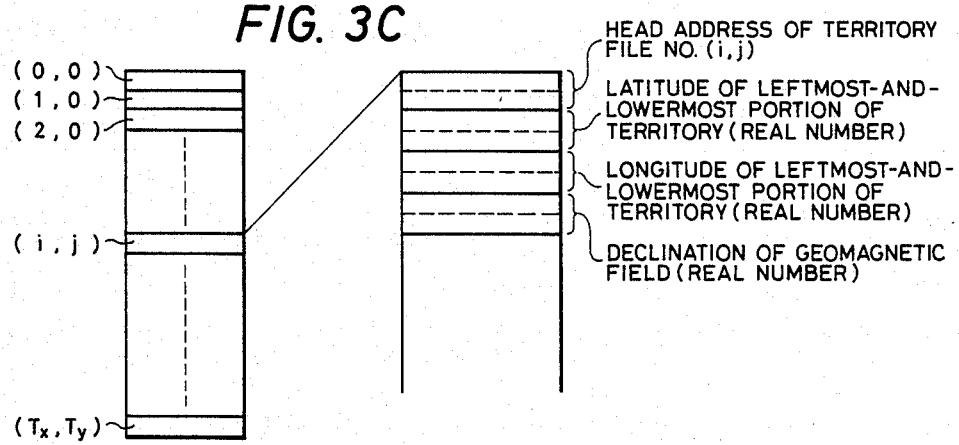

The map data formation is formed of tiers as shown in FIG. 3B. The lowermost layer 0 contains polygon data indicating the boundary of the area to be painted, such as a river, sea, pond, lake, wooded tract, or the like, a layer 1 contains line data for roads, train tracks, and the like, a layer 2 contains character data for some kinds of marks to be displayed, a layer 3 contains character data such as the name of the map, and an uppermost layer 4 contains intersection data. The intersection data in the uppermost layer is used for connecting to intersections (as described later) and is not displayed on the display unit.

Figure 4A:
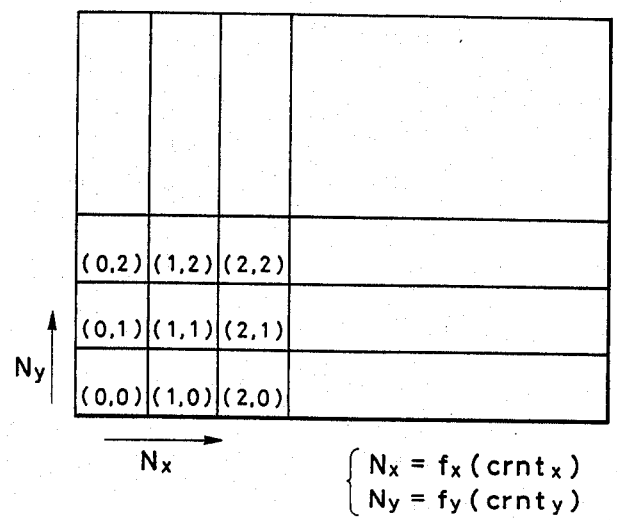

As shown in FIG. 4A, one territory is divided into 256 squares. One such square, hereinafter called a "unit", is 1,024 ($=2^{10}$) meters square, and is assigned a unique identifying number ($N_x$, $N_y$). An actual unit number ($N_x$, $N_y$) is determined by the present location datum (Crnt x, Crnt y) of the vehicle. The map information is recorded in units. The territory file consists of 256 units. The map is displayed based on units, and accordingly the unit is called a base unit of the display.

Figure 4B:
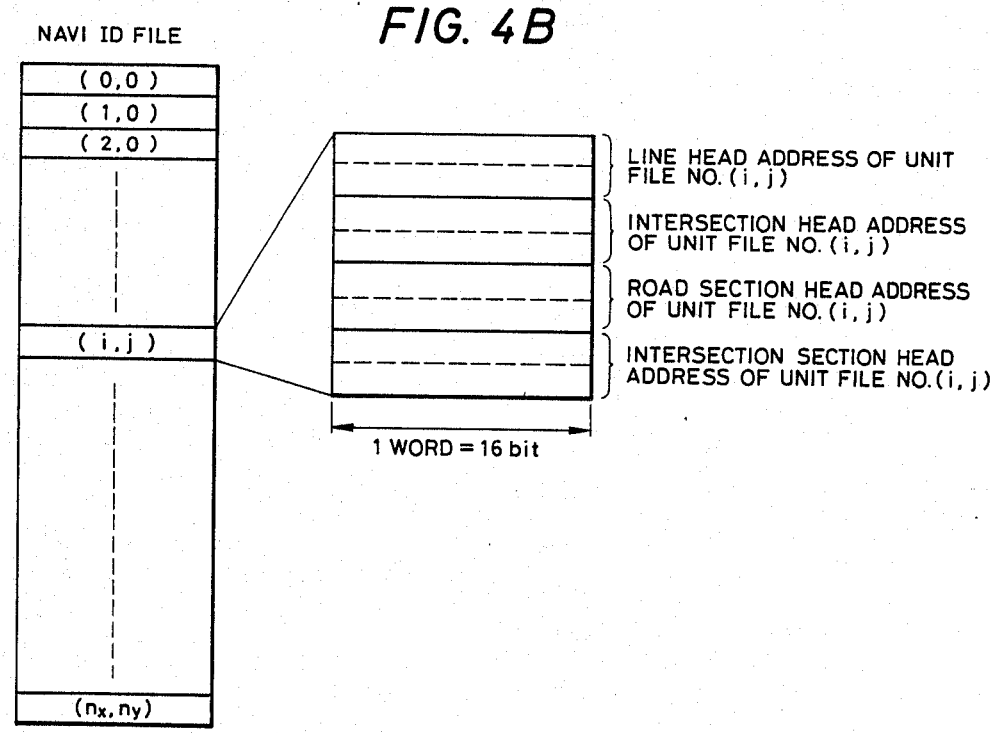
Figure 6A:
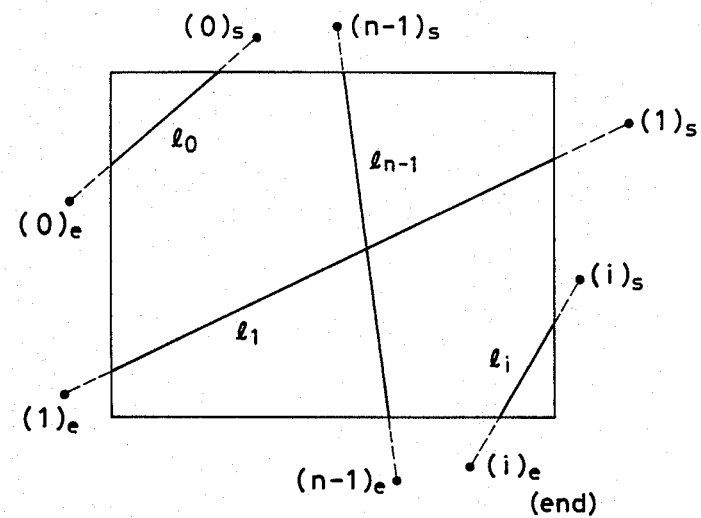
Figure 6B:
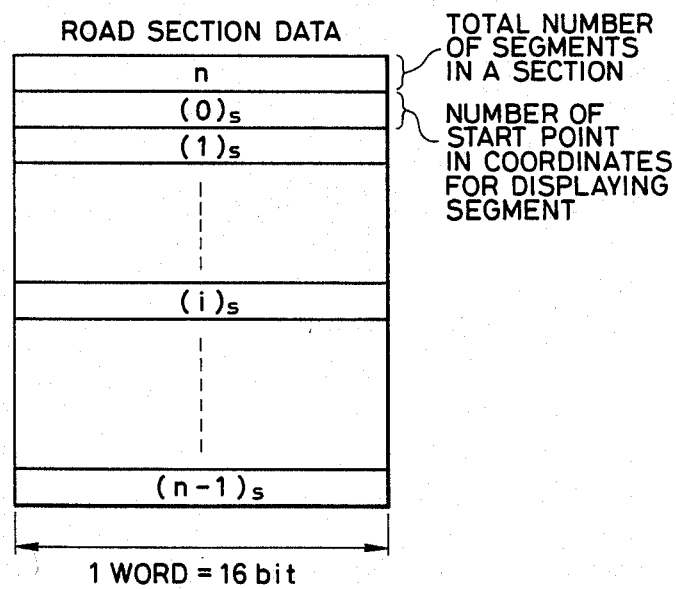
Figure 7A:
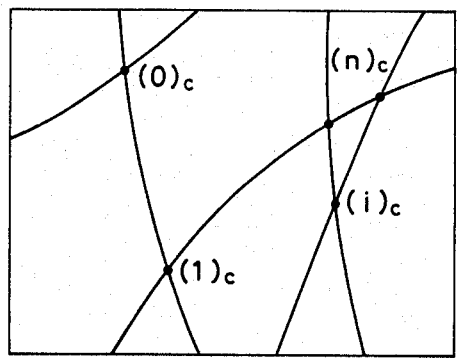
Figure 7B:
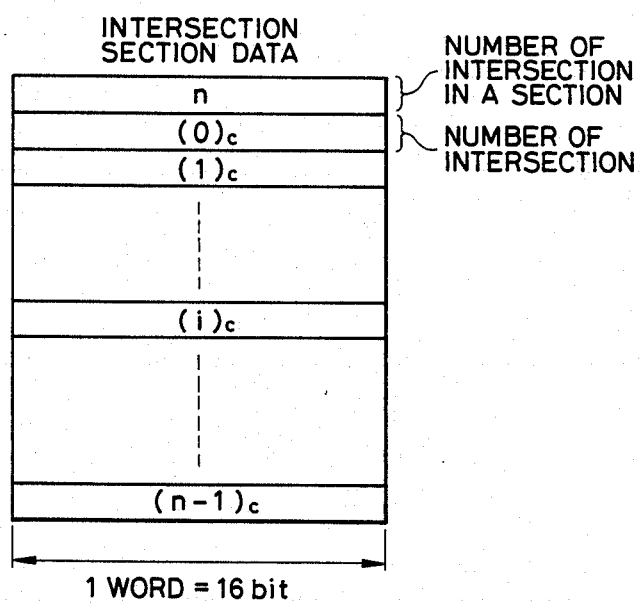

As shown in FIG. 4B, the NAVI ID file contains data files for every unit, each of which has its own unit number ($N_x$, $N_y$). Each data files includes a line head address, an intersection head address, a road section head address, and the like.

As shown in FIG. 5A, one unit is divided into 16 parts. Each of these parts, called herein a "section", is 256 ($=2^8$) meters square, and is assigned a unique section number ($S_x$, $S_y$). An actual section number is determined by the present place datum (Crnt X, Crnt Y) of the vehicle (user). The section is the smallest unit for the control of data formation according to the present invention. Information for the segments (the road and the like is displayed by a linkage of the segments) and the intersections is recorded in the territory file, as section tables as shown in FIG. 5B and 5C, and further as section data as shown in FIGS. 6A, 6B and FIGS. 7A, 7B.

Figure 8A:
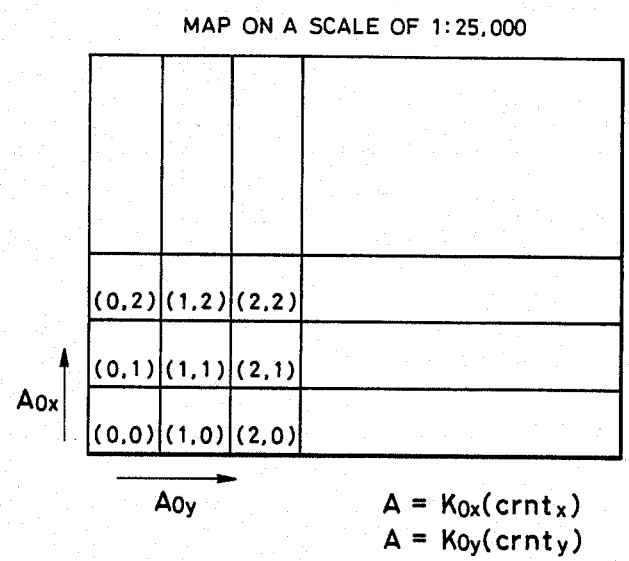
Figure 8B:
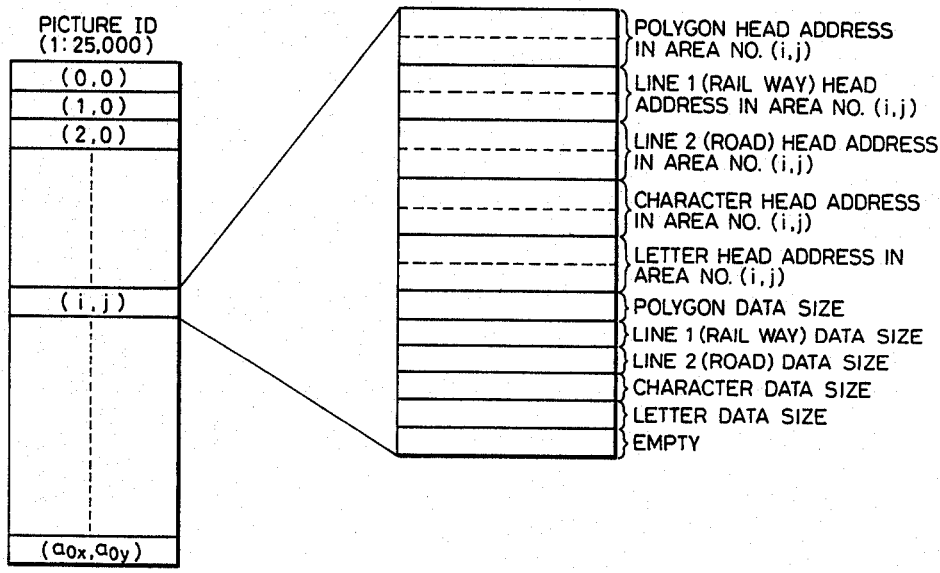

Picture ID files are stored in the territory file, as shown in FIG. 3A. According to the invention, the map information is drawn on a scale of 1 to 25,000, 1 to 50,000, and 1 to 100,000, for example. The actual map information for the display is drawn on the largest scale, that is, 1 to 25,000. Each of the maps drawn on the above-mentioned scales is divided into areas having their own area numbers ($An_x$, $An_y$) as shown in FIGS. 8A, 9A and 10A. An actual area number ($An_x$, $An_y$) is determined by the present location datum (Crnt x, Crnt y). In a map drawn on a scale of 1 to 25,000, the area number is the same as the unit number. In a map drawn on a scale of 1 to 50,000, one area corresponds to four unit files. In map drawn on a scale of 1 to 100,000, one area corresponds to 16 unit files. As shown in FIGS. 8B, 9B and 10B, in each of the picture IDs there are stored head addresses and data size polygon data, line data, and character data, which are necessary for displaying the map drawn on the designated scale.

Figure 11A:
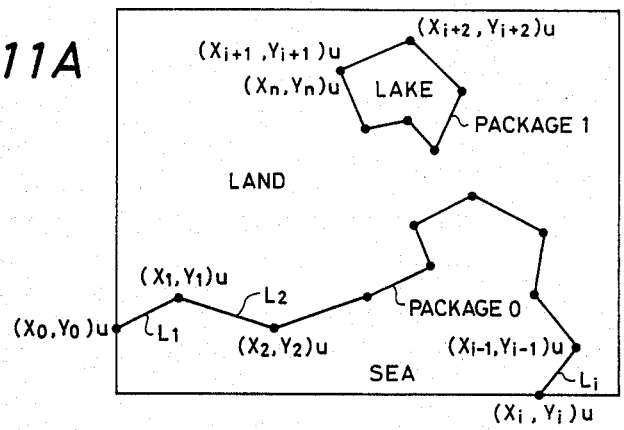
Figure 11B:
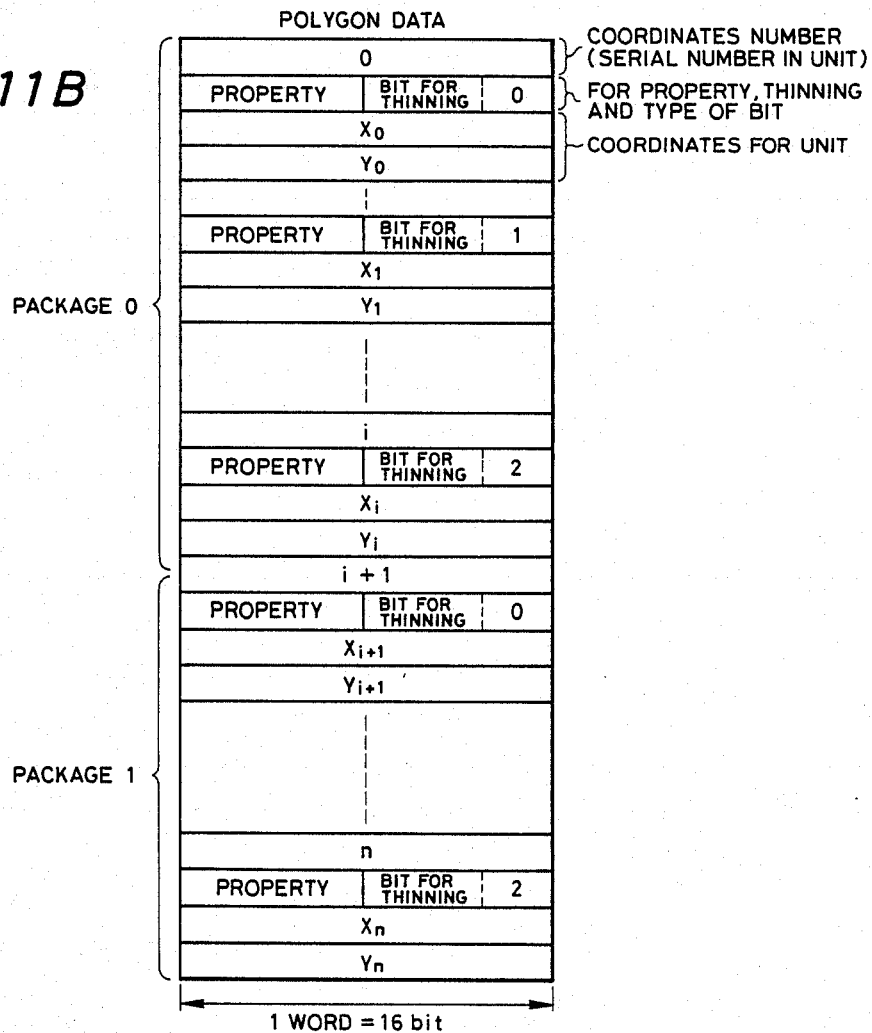
Figures 12A, 12B:
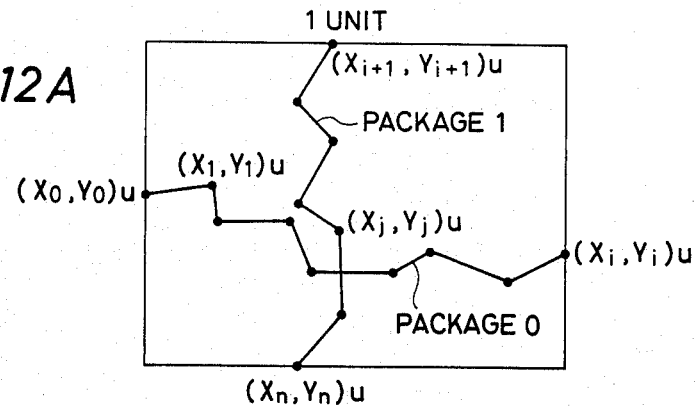

Each polygon datum and each line datum includes a link of segments having a start dot and an end dot. If maps drawn on the scale of 1 to 50,000 and on the scale of 1 to 100,000 are displayed using the map data from the scale of 1 to 25,000, which is the largest scale, all points in all segments on the scale of 1 to 50,000 and on the scale of 1 to 100,000 may not be actually displayed because the length between the start dot and the end dot is reduced. In view of this fact, information relating to the dots which are omitted is pre-stored as thinning bits in the polygon data and the line data, as shown in FIG. 11B and 12B. When the map is actually displayed on the display unit, the portion of a segment actually displayed may be reduced if required by omitting the thinning bits when such thinning bits are present in the polygon data or the line data.

The polygon data will be described below in detail. When evaluating and storing the start and end dots of each of the segments delineating the boundaries of the area to be painted, the evaluated data is stored sequentially so that each of the segments has a handedness with respect to the area to be painted. For example, it is assumed that the right side of each of the segments is always in an area (the sea) to be painted, as shown in FIG. 11A. A first segment Ll has a start dot at (x0, y0) and an end dot at (x1, y1), a second segment L2 has a start dot at (x1, y1) and an end dot at (x2, y2), ... and a segment Li has a start dot at (xi−1, yi−1) and an end dot at (xi, yi). These data are stored sequentially so that each of the segments has a 2-dimensional length deflection and can be defined by vectors. If these data are read out sequentially in the sequence in which they were stored, the direction from the vectors of each of the segments to the area to be painted can be determined from the relationships of each of the data so that the right side of the vector of the segments is determined as the area to be painted. The map data will be described below in the case that a V-RAM, for example, is used as the graphic memory 11.

Figure 13A:
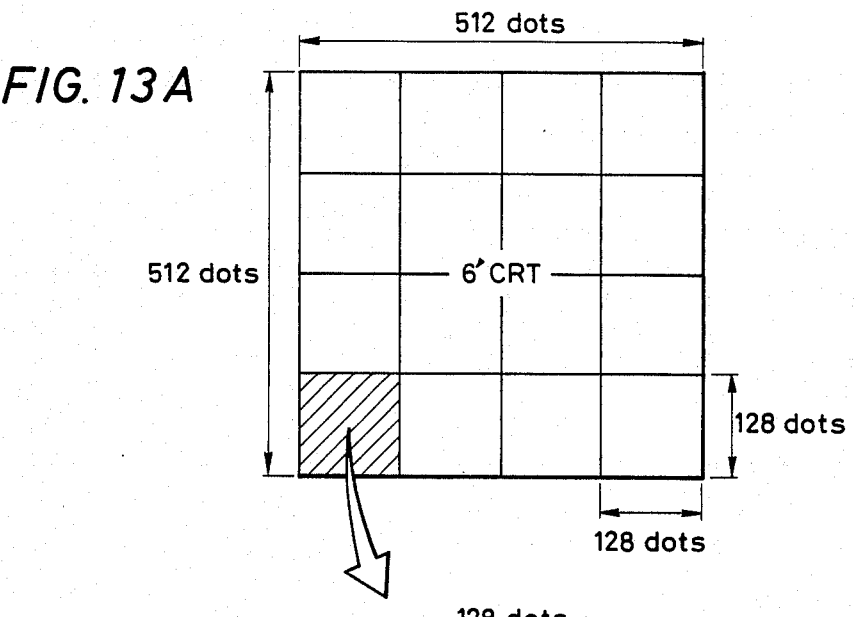
FIGS. 13A to 13C shows picture formation in a V-RAM.
Figure 13B:
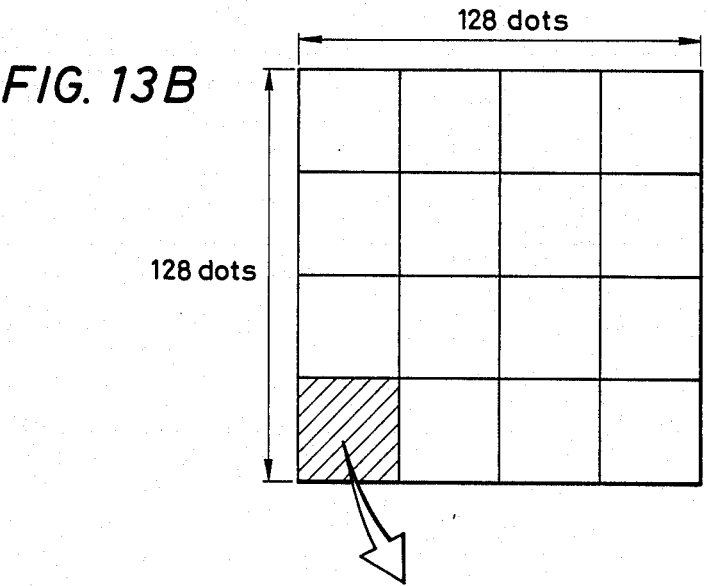
Figure 13C:
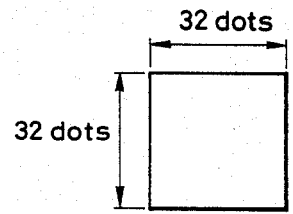

As shown in FIG. 13A, a portion of the V-RAM 512 dots square is divided into 16 areas. Each of the areas is 128 dots square and displays an independent map. One area is divided into 16 sections, each of which is composed of 32 dots square, as shown in FIGS. 13B and 13C. A typical display unit mounted on a vehicle can display a picture having 256 dots square corresponding for instance, to central four areas surrounded by a thick line shown in FIG. 13A. These areas move within the V-RAM in order to always display the present location of the vehicle on the display unit.

FIG. 14 is a flowchart showing the basic operations performed by the CPU 7.

The CPU 7 first performs initialization (step SI), and then determines whether information indicating the present location of the vehicle is present or not (step S2). If this information is not present, then a present location setting program is executed (step S3) by, for example, a key operation of the input device 14. Next, the driving distance is set to "0" (step S4), and after that whether or not a key input has been received is determined (step S5).

If no key input is detected at step S5, a map of the area around the vehicle is displayed on the display unit 123 and the location where the vehicle is at present and the azimuth thereof are indicated on the map with a vehicle mark or the like. When the vehicle moves, the map is scrolled correspondingly to thereby always display the location where the vehicle is at present on the display unit 12. When the vehicle on the display unit 12 is almost ready to cross into an adjacent, not presently displayed area of the map represented by data stored in the graphic memory 11, the necessary map data is read from the recording medium 10 and displayed on the display unit 12 (step S6).

If the key input is operated, the present location is reset (step S7), compensation of the sensors (step S8), setting of the destination (step S9), and magnification or reduction of the map (step S10) are performed according to the key input instruction.

Figure 15:
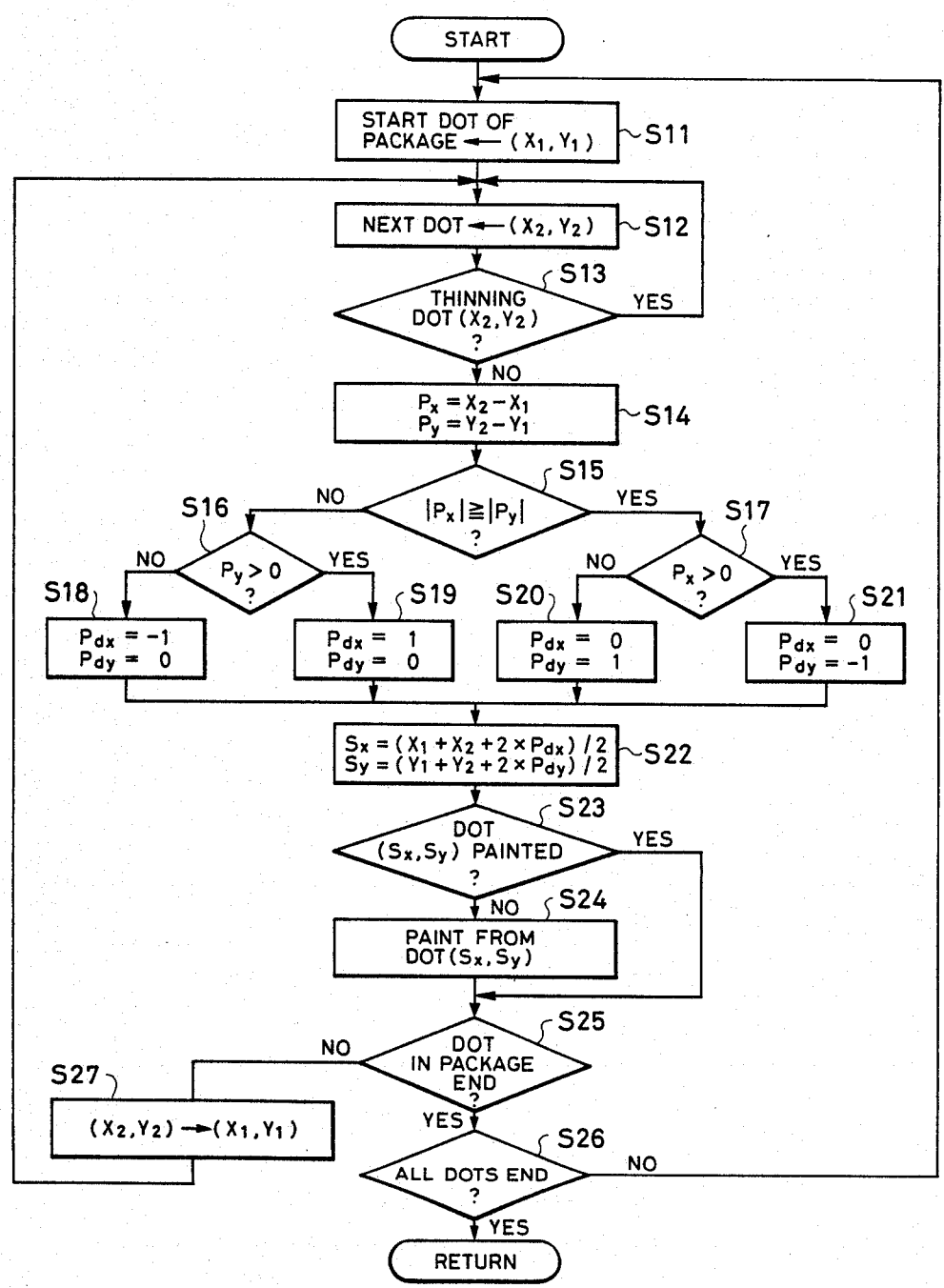
FIG. 15 is a flowchart showing a program, performed by a CPU, for displaying a map according to a method of the invention.

The program performed by the CPU 7 for displaying the map will be described with reference to FIGS. 15 and 16. FIG. 15 is a flowchart showing the program, and FIG. 16 shows an example of the map in the case that the area to be painted is a river.

Figure 16:
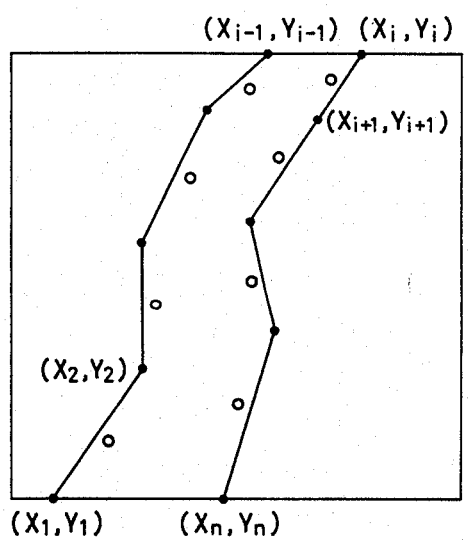
FIG. 16 shows a start point for an area to be painted and each of a plurality of segments in one package.

FIG. 16 shows a unit which is the smallest unit for the map to be painted. The unit displays one line sequence from a start dot (x1, y1) to an end dot (xi−1, yi−1) and another line sequence from a start point (xi, yi) to an end dot (xn, yn).

First, the start dot (x1, y1) of the line sequence is stored in a register A by the CPU 7 (step S11), and then the next dot (x2, y2) is stored in a register B (step S12). After the dot (x2, y2) is stored, the CPU 7 determines if this dot should be thinned or not (step S13). This determination is performed by checking the thinning bit in the polygon data shown in FIG. 11B. If the thinning bit is present, the program returns to step S12, and then the next dot is stored in the register B.

Figure 17:
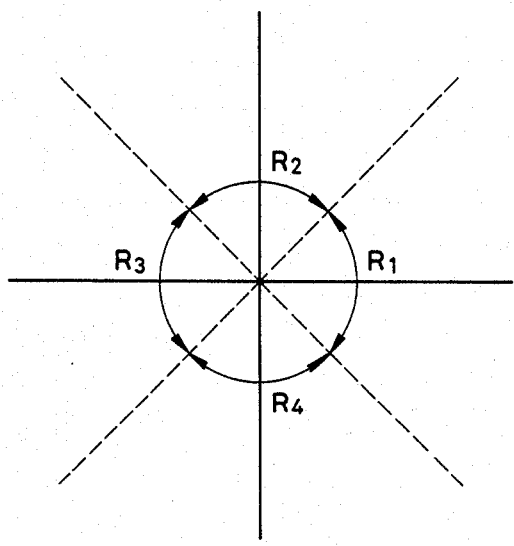
FIG. 17 shows a divided area where coordinates of a segment are positioned.

If there is no thinning bit, differences (px, py) in the X-Y coordinates between the dots (x1, y1) and (x2, y2) are calculated and stored in a register C (step S14). Absolute values of px and py are compared with each other (step S15). The CPU 7 determines if each of px and py is positive or negative (steps S16 and S17). A constant value (pdx, pdy) is set according to these dots as determined in steps S15 to S17 (steps S18 to S21). The constant value (pdx, pdy) is used for calculating a start point for painting the predetermined area. Thus, the vector of the segment defined by the dots (x1, y1) and (x2, y2) are determined in steps S15 to S17. In FIG. 17, areas R1, R2, R3 and R4 correspond to steps S21, S19, S20 and S18, respectively. The CPU 7 determines if the vector of the segment defined by the dots (x1, y1) and (x2, y2) fall within these areas.

The start point (sx, sy) for painting the predetermined area is calculated based on the constant value (pdx, pdy) determined in steps S18 to S21 (step S22). In step S22, a middle point of the segment is shifted one dot inward of the area to be painted as illustrated by the circles in FIG. 16. Next, it is determined whether the start point (sx, sy) has already been painted according to, for example, the color data of the start point (step S23). If the start point has not yet been painted, the predetermined area is painted from the start point (sx, sy) (step S24). The CPU 7 determines whether all dots in the package have been painted (step S25), and if not, the dot data (x2, y2) stored in the register B is moved to register A (step S27). After a predetermined time, the program returns to step S12 and repeats the above-described steps. If all dots in the line sequence have been painted, the CPU 7 determines if this operation has been performed for all line sequences (step S26). If not, the program returns to step S11 and the above-described steps are repeated.

Figure 18:
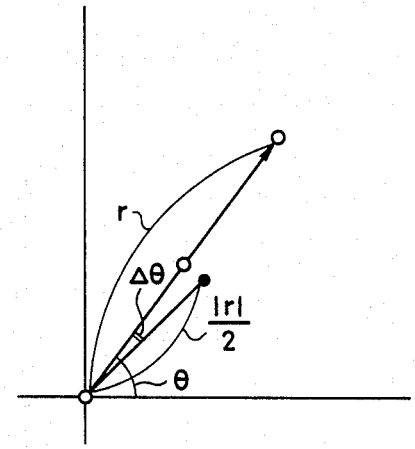
FIG. 18 shows, in polar coordinates, an origin which is a start dot of a segment.

After the above-described steps, the actual start point for painting is obtained as follows:

FIG. 18 shows in polar coordinates at the origin the start dot of the segment. In such coordinates, the segment is indicated as a vector of length r (which is the length of the segment) and an angle $\theta$, which is the angle of the segment. The start point (sx, sy) is set to a point which is rotated through an angle $\Delta\theta$ corresponding to one dot in the above-described embodiment of the invention and offset from the start dot by a distance of r/2.

As described above, according to the present invention, the start and end dots of each of the segments defining the boundaries of an area on the map to be painted are evaluated, and each of the segments is stored in memory so that the vector segments have a left or right handedness with respect to the area to be painted. When the area to be painted is actually displayed on the display unit, the start point for painting each of the segments is calculated according to a chosen side direction of the segment and the evaluated data. Therefore, since it is not necessary to pre-store data for the start point for painting, the method of the invention does not require complex manual inputting operations for the data for the start point for painting the area.

Further, according to the method of the invention, the map data can be freely divided when displayed on the display unit.

What is claimed is:

1. A method for displaying a map on an electronic display unit, comprising the steps of:
    evaluating a start dot and an end dot of each of a plurality of segments defining boundaries of a predetermined area on the map;
    storing sequentially each of the evaluated start and end dots so that each of said segments has a predetermined directional relationship with respect to said predetermined area;
    determining a direction from at least one of said segments toward said predetermined area according to said evaluated start and end dots of said at least one segment
    calculating a start point for coloring positioned inside said predetermined area and offset from said at least one segment according to said determined direction from said at least one segment and at least one pair of said evaluated start and end dots: and
    coloring said predetermined area on said electronic display unit with a predetermined color starting from said start point.

2. The method for displaying a map as recited in claim 1 wherein said step of evaluating said start dot and said end dot comprises the steps of: (a) determining two differences in X and Y coordinates respectively between said start and end dots, (b) comparing absolute values of said two differences to produce a first logical value (c) determining whether at least one of said two differences is positive or negative to produce a second logical value. (d) assigning a constant value in accordance with said first and second logical values and (e) calculating a start point for said coloring in accordance with said constant value.

3. The method for displaying a map of claim 2, further comprising the steps of, prior to said step (a), determining whether each start dot and end dot is a dot to be thinned, and discarding the dot it is determined to be a dot to be thinned.

4. A method for displaying a map on an electronic display unit, comprising the steps of:
   (a) storing a start dot (x1, y1) and an end dot (x2, y2) of each line segment defining a portion of each area to be colored on said map;
   (b) determining differences px and py by the equations px=x2−x1 and py=y2−y1;
   (c) determining whether $|px| \geq |py|$;
      (1) if $|px| \geq |py|$, determining whether px >0;
         (i) if px>0, setting variables pdx and pdy according to the equations pdx=0 and pdy=−1;
         (ii) if px $\leq$ 0, setting pdx=0, setting pdx=0 and pdy=1;
      (2) if $|px| < |py|$, determining whether py>0;
         (i) if py>0, setting pdx=1 and pdy=0;
         (ii) if py$\leq$0, setting pds=−1 and pdy=0;
   (d) determining a start point (sx, sy) for coloring as:

$sx=(x1+y2+2 \cdot pdx)/2$, and $sy=(y1+y2+2 \cdot pdy)/2$;

(e) determining whether the area to be colored in which said start point falls has already been colored; and
   (f) if the area has not already been colored, coloring said area starting from said start point with a predetermined color on said electronic display unit.

5. The method for displaying a map as recited in claim 4, further comprising the steps of, prior to said step (b) determining whether each dot stored is a dot to be thinned, and if said dot is to be thinned, discarding said dot and storing another dot.

* * * * *